US 9,527,175 B2

United States Patent
Hoshi et al.

(10) Patent No.: US 9,527,175 B2
(45) Date of Patent: Dec. 27, 2016

(54) MOVING BODY GUIDE MECHANISM OF MACHINE TOOL

(71) Applicant: DMG MORI SEIKI CO., LTD., Nara (JP)

(72) Inventors: Takashi Hoshi, Nara (JP); Hajime Kimura, Nara (JP); Ryosuke Yasumura, Shiga (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 116 days.

(21) Appl. No.: 14/613,999

(22) Filed: Feb. 4, 2015

(65) Prior Publication Data
US 2015/0239083 A1 Aug. 27, 2015

(30) Foreign Application Priority Data
Feb. 24, 2014 (JP) ................. 2014-033371

(51) Int. Cl.
*B23Q 5/32* (2006.01)
*B23Q 1/62* (2006.01)
*B23Q 1/70* (2006.01)
*B23Q 1/01* (2006.01)

(52) U.S. Cl.
CPC ............... *B23Q 1/626* (2013.01); *B23Q 1/017* (2013.01); *B23Q 1/70* (2013.01); *B23Q 5/326* (2013.01); *Y10T 409/306664* (2015.01)

(58) Field of Classification Search
CPC ..................... Y10T 409/309576; B23Q 1/017; B23Q 1/70; B23Q 5/32; B23Q 5/326; B23Q 1/706
See application file for complete search history.

(56) References Cited

U.S. PATENT DOCUMENTS

| | | | | | |
|---|---|---|---|---|---|
| 3,455,207 A | * | 7/1969 | Meinke | ..................... | B23Q 1/28 408/129 |
| 5,314,397 A | * | 5/1994 | Mills | ........................ | B23Q 1/01 29/26 A |
| 5,368,425 A | * | 11/1994 | Mills | ........................ | B23Q 1/01 408/234 |
| 5,829,932 A | * | 11/1998 | Kis | ......................... | B23Q 1/26 408/13 |

(Continued)

FOREIGN PATENT DOCUMENTS

| | | | | |
|---|---|---|---|---|
| DE | 19645324 A1 | * | 5/1998 | ............. B23Q 1/015 |
| DE | 19650360 A1 | * | 5/1998 | ............. B23Q 1/015 |

(Continued)

OTHER PUBLICATIONS

Machine translation of JP 2001-030129, printed Jul. 2016.*

*Primary Examiner* — Daniel Howell
(74) *Attorney, Agent, or Firm* — IP Business Solutions, LLC

(57) ABSTRACT

A moving body guide mechanism of a machine tool includes at least two bar-shaped guide members, and sliders engaged with the two guide members, respectively, movably with respect to the guide members so that a moving body is guided along an axis parallel to a moving axis extending in a longitudinal direction of the guide members. Attaching surfaces of the two guide members or the sliders to the moving body are provided symmetrically across a plane including the axis parallel to the moving axis in such a manner that an angle formed by the attaching surfaces becomes smaller than 180°.

15 Claims, 4 Drawing Sheets

(56) References Cited

U.S. PATENT DOCUMENTS

| | | | | |
|---|---|---|---|---|
| 6,161,995 | A * | 12/2000 | Wakazono | B23Q 1/015 408/234 |
| 7,093,334 | B2 * | 8/2006 | Sobrito | B23Q 1/017 29/26 A |
| 7,240,411 | B2 * | 7/2007 | Matsumoto | B23Q 1/26 29/27 C |
| 8,210,781 | B2 * | 7/2012 | Chang | B23Q 5/40 408/234 |
| 9,044,837 | B2 * | 6/2015 | Chen | B23Q 1/70 |
| 2012/0039683 | A1 * | 2/2012 | Sugiyama | B23Q 1/012 409/202 |

FOREIGN PATENT DOCUMENTS

| | | | |
|---|---|---|---|
| JP | 2000079528 A | * | 3/2000 |
| JP | 2001030129 A | * | 2/2001 |
| JP | 4373892 B2 | | 11/2009 |

\* cited by examiner

MOVING BODY GUIDE MECHANISM OF MACHINE TOOL

CROSS-REFERENCE TO RELATED APPLICATIONS

The present application claims priority under 35 U.S.C. 119 to Japanese Patent Application No. 2014-033371, filed on Feb. 24, 2014, the content of which is incorporated herein by reference in its entirety.

BACKGROUND OF THE INVENTION

1. Field of the Invention

The present disclosure relates to a moving body guide mechanism of a machine tool such as a horizontal machining center for supporting and guiding a moving body thereof such as a spindle in a movable manner.

2. Description of the Related Art

The following description of related art sets forth the inventors' knowledge of related art and certain problems therein and should not be construed as an admission of knowledge in the prior art.

In a horizontal machining center, as a spindle guide mechanism for supporting and guiding a spindle in a horizontally movable manner, there is one disclosed in Japanese Patent No. 4373892, for example. In this conventional spindle guide mechanism, a pair of left and right guide rails is disposed on a head that supports a spindle so as to extend in a horizontal direction. Linear guides fixed to the spindle are slidably engaged with the guide rails. A ball screw is provided between the left and right guide rails so as to extend in the horizontal direction. A nut member fixed to the spindle is screwed on the ball screw. A drive motor is coupled to one end portion of the ball screw, and the drive motor is fixed to the head.

In the conventional spindle guide mechanism, there is employed a structure in which the ball screw is disposed between the left and right paired guide rails and the drive motor is coupled to a rear end portion of the ball screw. Therefore, this ball screw or the drive motor need to be disposed apart from the axis of the spindle to such an extent that they do not interfere with the guide rails, or an interval between the guide rails needs to be increased. Therefore, there is caused a problem that the spindle guide mechanism is increased in size.

Further, when the ball screw is disposed apart from the axis of the spindle, the ball screw far from the axis of the spindle is driven, which increases the residual vibration and makes it difficult to increase acceleration. Therefore, there is also a problem that speeding up cannot be achieved.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred disclosed embodiments of the present invention have been developed in view of the above-mentioned and/or other problems in the related art. The preferred disclosed embodiments of the present invention can significantly improve upon existing methods and/or apparatuses.

The present disclosure has been made in consideration of the aforementioned conventional circumstances, and has an object to provide a moving body guide mechanism of a machine tool capable of being downsized. Another object is to provide a moving body guide mechanism of a machine tool capable of increasing acceleration of a moving body by suppressing residual vibration. Still another object is to provide a machining center equipped with the moving body guide mechanism.

According to a first aspect of the present disclosure, a moving body guide mechanism of a machine tool include at least two bar-shaped guide members, and sliders engaged with the two guide members, respectively, movably with respect to the guide members so that a moving body is guided along an axis parallel to a moving axis extending in a longitudinal direction of the guide members. Attaching surfaces of the two guide members or the sliders to the moving body are provided symmetrically across a plane including the axis parallel to the moving axis in such a manner that an angle formed by the attaching surfaces becomes smaller than 180°.

According to the present disclosure, the attaching surfaces of the two guide members or the sliders to the moving body are provided symmetrically across a plane including the axis parallel to the moving axis in such a manner that the angle formed by the attaching surfaces becomes smaller than 180°. In other words, the left paired guide member and slider and the right paired guide member and slider are provided to form an inverted V-shape with respect to the plane. Therefore, a ball screw, or a drive motor, to be disposed between the left paired guide member and slider and the right paired guide member and slider can be disposed closer to the axis of the moving body, and therefore the moving body guide mechanism can be downsized.

Further, since the ball screw can be provided closer to the axis of the moving body, a potion close to the center of gravity of the moving body can be driven. Therefore, residual vibration can be suppressed, acceleration can be increased, and speeding up of machining can be achieved.

In a preferred embodiment of the present disclosure, the two guide members or the sliders are provided in such a manner that the angle formed by the attaching surfaces becomes 90°.

According to the aforementioned preferred embodiment of the present disclosure, since being structured in such a manner that the angle formed by the attaching surfaces becomes 90°, the moving body guide mechanism can equally receive a cutting load and the moment in, for example, an X-axis direction and a Y-axis direction, and it is possible to extend a lifetime of the guide rails and the sliders.

In another preferred embodiment of the present disclosure, the two guide members or the sliders are provided in such a manner that the attaching surfaces extend in a longitudinal direction.

According to the another preferred embodiment of the present disclosure, since the two guide members or the sliders are provided in such a manner that the attaching surfaces extend in the longitudinal direction, when the moving body is supported movably in the horizontal direction, the ball screw, or the drive motor, to be disposed between the paired guide member and slider and the paired guide member and slider can be disposed closer to the axis of the moving body. Therefore, the moving body guide mechanism can be downsized.

In still another preferred embodiment of the present disclosure, the moving body is a spindle including an axis extending in a horizontal direction and rotationally driving a tool attached to a tip portion of the spindle, and the two guide members or the sliders are provided above the axis in such a manner that the angle formed by the attaching surfaces becomes 90° and the attaching surfaces extend in the longitudinal direction.

According to the still another preferred embodiment of the present disclosure, since the spindle disposed in the horizontal direction is guided by the guide members and the sliders disposed above the axis of the spindle in such a manner that the angle formed by the attaching surfaces becomes 90° and the attaching surfaces extend in the longitudinal direction, as compared to the case where the guide mechanism is disposed below the spindle, a lowermost end position of a Y-axis stroke of the spindle can be positioned lower. As a result, a disposition position of a work to be machined on the spindle can be positioned lower, and therefore handling such as attachment/detachment of a work is facilitated.

Further, since there is no guide mechanism below the spindle, a margin space is made and by using the margin space, support stiffness of a bed can be improved.

According to a second aspect of the present disclosure, a moving body guide mechanism of a machine tool includes a first guide member, a second guide member arranged in parallel to the first guide member, a first slider slidably engaged with the first guide member, and a second slider slidably engaged with the second guide member. The first slider and the second slider are sidably moved along the first guide member and the second guide member, respectively, to guide a moving body along an axis parallel to a longitudinal direction of the guide members. Attaching surfaces of the first and second guide members or the first and second sliders to the moving body are provided such that an angle formed by the attaching surfaces is smaller than 180°.

According to a third aspect of the present disclosure, a machining center includes a first guide member, a second guide member arranged in parallel to the first guide member, a first slider slidably engaged with the first guide member, a second slider slidably engaged with the second guide member, a moving body attached to a first attaching surface of the first slider and a second attaching surface of the second slider, a rotation driving shaft arranged in parallel to the first guide member and the second guide member, the rotation driving shaft having an axis of rotation, a driving source configured to rotate the rotation driving shaft, and a driven member configured to be moved along the rotation driving shaft when the rotation driving shaft is rotated by the driving source, the driven member being attached to the moving body. An angle between a first linear line connecting the axis of rotation of the rotation driving shaft and a widthwise center of the first attaching surface of the first slider and a second linear line connecting the axis of rotation of the rotation driving shaft and a widthwise center of the second attaching surface of the second slider is smaller than 180°.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "coupled" or "fixed" to or "on" another element, it can be directly connected or coupled to or on the other element or intervening elements may be present. In contrast, when an element is referred to as being "directly coupled" or "directly fixed" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The preferred disclosed embodiments of the present invention are shown by way of example, and not limitation, in the accompanying figures, wherein.

DETAILED DESCRIPTION OF THE PREFERRED EMBODIMENT

The preferred disclosed embodiments of the present disclosure are shown by way of example, and not limitation, in the accompanying figures.

Hereinafter, there will be explained an embodiment of the present disclosure based on the attached drawings.

Figure 1:
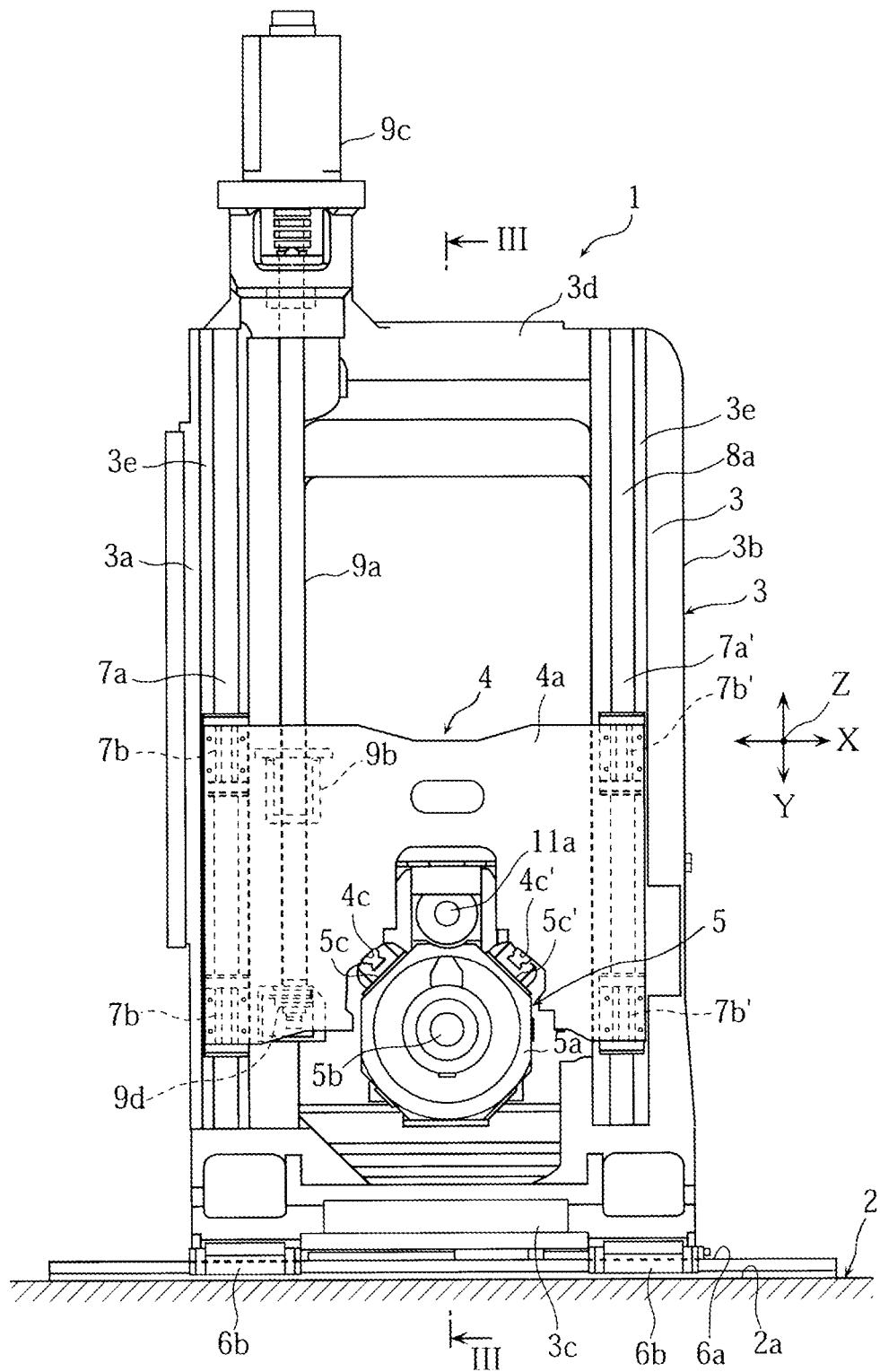
FIG. 1 is a front view of a horizontal machining center provided with a spindle guide mechanism according to Embodiment 1 of the present disclosure.
Figure 2:
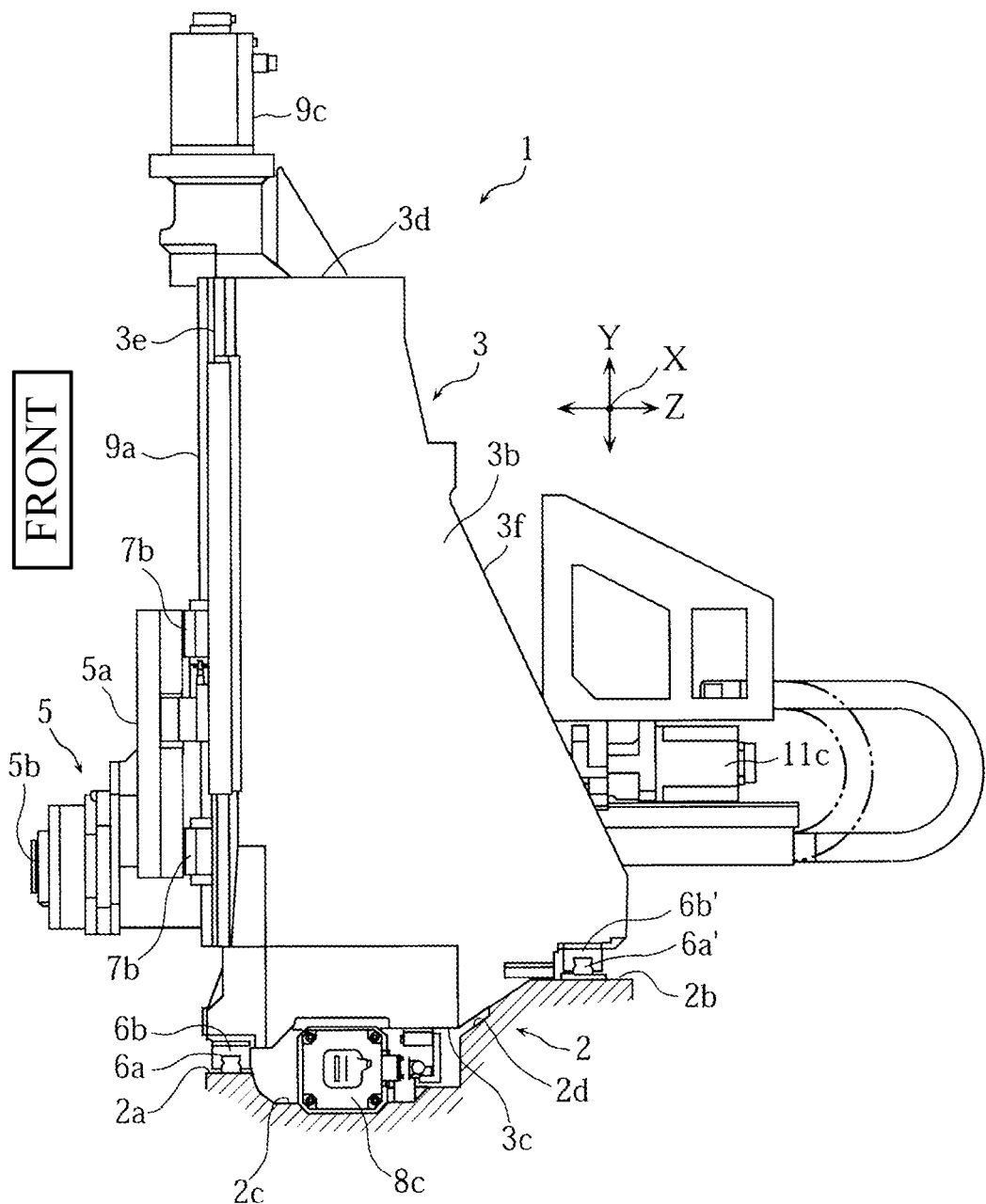
FIG. 2 is a side view of the horizontal machining center.
Figure 3:
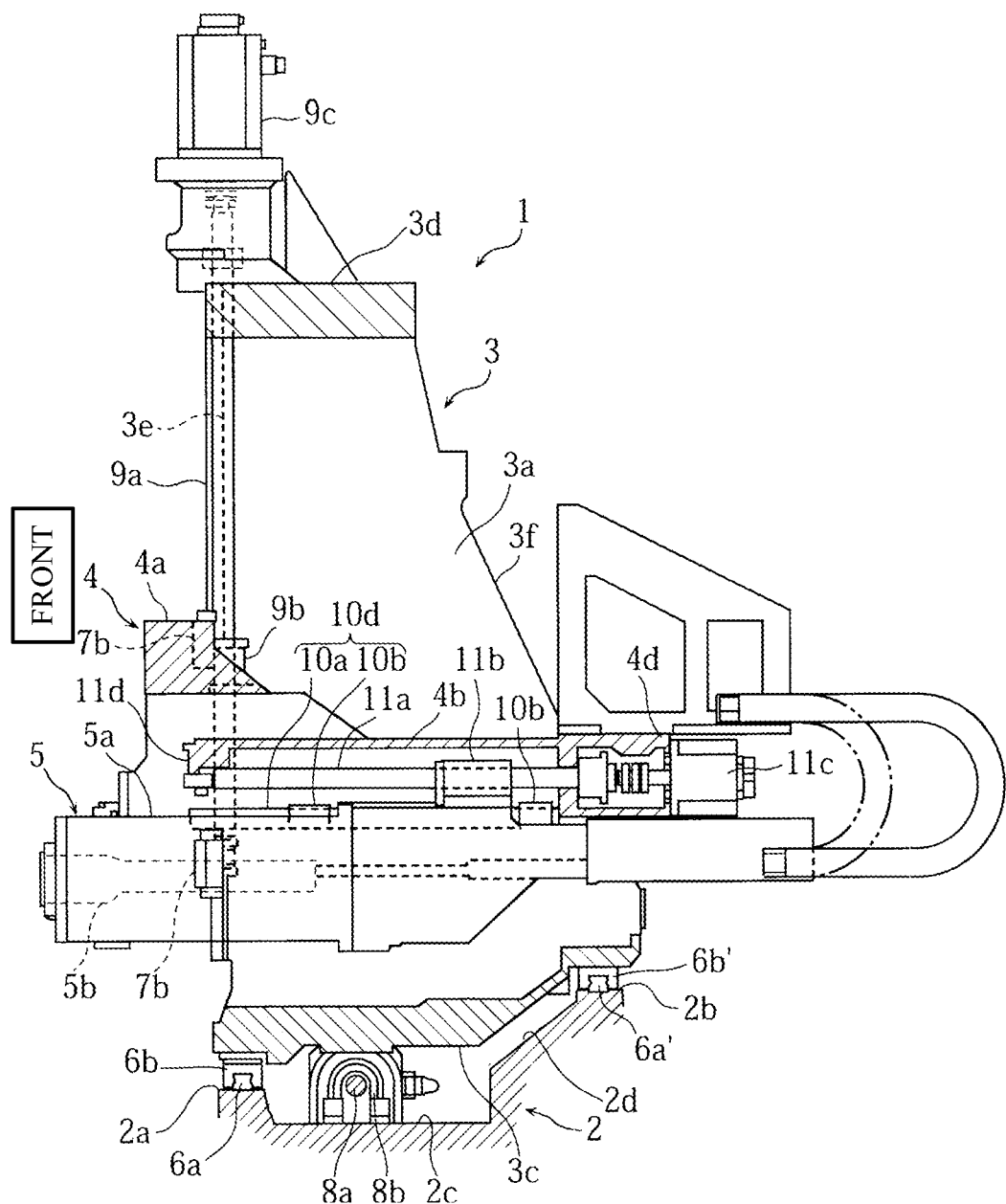
FIG. 3 is a cross-sectional side view (a cross-sectional view taken along the line III-III in FIG. 1) of the horizontal machining center.
Figure 4:
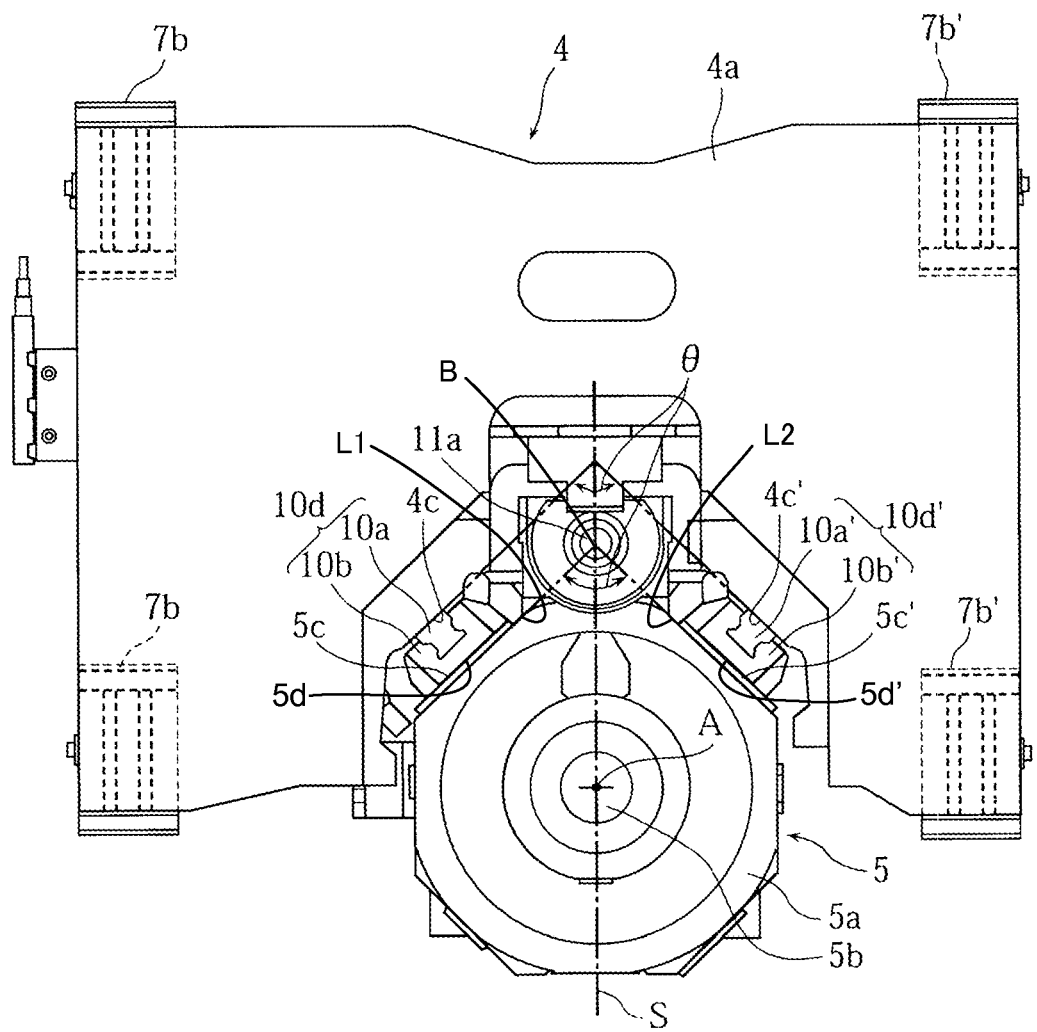
FIG. 4 is a front view of the spindle guide mechanism part of the horizontal machining center.

FIG. 1 to FIG. 4 are views for explaining a horizontal machining center provided with a spindle guide mechanism according to Embodiment 1 of the present disclosure.

In the drawings, the reference numeral "1" denotes a horizontal machining center (machine tool). The horizontal machining center 1 includes a bed 2, a column 3 mounted on the bed 2 movably in a horizontal direction (in an X-axis direction) when seen from a front side thereof, a saddle 4 supported by the front surface of the column 3 movably in an up-and-down direction (in a Y-axis direction), and a spindle (moving body) 5 supported by the saddle 4 movably in a front and rear direction (in a Z-axis direction).

On the bed 2, a front rail mounting surface 2a and a rear rail mounting surface 2b are formed so as to horizontally extend in the X-axis direction. This rear rail mounting surface 2b is disposed one step higher than the front rail mounting surface 2a. On the rear side of the front rail mounting surface 2a, a ball screw mounting part 2c is formed to be recessed a little. Between the ball screw mounting part 2c and the rear rail mounting surface 2b, an inclined wall 2d that increases in height as it goes to the rear side is formed.

On the front and rear rail mounting surfaces 2a and 2b, a front X-axis guide rail 6a and a rear X-axis guide rail 6a' extending in the X-axis direction are fixed parallel to the X-axis.

The column 3 includes, when viewed from the front side, left and right side wall portions 3a and 3b, a bottom wall part 3c, and an upper wall part 3d that connect lower end portions and upper end portions of the left and right side wall portions 3a and 3b, respectively, and formed into a vertically-long rectangular frame shape. Front end surfaces 3e of the left and right side wall portions 3a and 3b of the column 3 each forms a vertical plane, and rear end surfaces 3f thereof each forms an inclined surface positioned rearward as it goes to the lower end side, resulting in that the left and right side wall portions 3a and 3b each forms a substantially trapezoidal shape when viewed from the side.

On the front end portion of the bottom wall part 3c of the column 3, left and right front X-axis sliders 6b and 6b are fixed. On the rear end portion of the bottom wall part 3c of the column 3, left and right rear X-axis sliders 6b' and 6b' are fixed to be positioned one step higher than the front X-axis sliders 6b. The front and rear X-axis sliders 6b and 6b' are slidably fitted to the front X-axis guide rail 6a and the rear X-axis guide rail 6a' respectively.

At the ball screw mounting part 2c of the bed 2, an X-axis ball screw 8a extending in the X-axis direction is disposed parallel to the X-axis. This X-axis ball screw 8a is supported by a bearing 8b on the ball screw mounting part 2c rotatably and immovably in the axial direction.

Further, an X-axis nut member (not illustrated) is screwed on the X-axis ball screw 8a, and the X-axis nut member is fixed to the bottom wall part 3c of the column 3. Further, to one end of the X-axis ball screw 8a, an X-axis drive motor 8c is coupled, and the motor 8c is fixed to the ball screw mounting part 2c.

As the X-axis drive motor 8c rotationally drives the X-axis ball screw 8a, the column 3 moves forward and backward in the X-axis direction.

Left and right Y-axis guide rails 7a and 7a' extending in the Y-axis direction are disposed and fixed to the front end surfaces 3e and 3e of the left and right side wall portions 3a and 3b of the column 3 parallel to the Y-axis.

The saddle 4 includes a front surface part 4a having a substantially rectangular shape when viewed from the front side, and a support part 4b integrally extending rearward from the front surface part 4a. On top left and right corner portions and bottom left and right corner portions of the rear surface of the front surface part 4a, left and right Y-axis sliders 7b and 7b' are fixed, and the left and right Y-axis sliders 7b and 7b' are slidably engaged with the left and right Y-axis guide rails 7a and 7a' fixed to the column 3 so as to be movable in the Y-axis direction (i.e., in the vertical direction).

Further, on the rear side of the front surface part 4a of the saddle 4, a Y-axis ball screw 9a extending in the Y-axis direction is provided adjacently to the left Y-axis guide rail 7a and parallel to the Y-axis. Further, a Y-axis nut member 9b is screwed on a middle portion of the Y-axis ball screw 9a, and the Y-axis nut member 9b is fixed to the rear surface of the front surface part 4a. Further, to an upper end portion of the Y-axis ball screw 9a, a Y-axis drive motor 9c is coupled, and the Y-axis drive motor 9c is fixed to the upper wall part 3d of the column 3.

When the Y-axis drive motor 9c rotationally drives the Y-axis ball screw 9a, the saddle 4 moves up and down in the Y-axis direction (i.e., in the vertical direction).

Further, on the support part 4b of the saddle 4, left and right rail attaching surfaces 4c and 4c' are formed to extend in the Z-axis direction (i.e., in the horizontal direction). These left and right rail attaching surfaces 4c and 4c' are formed symmetrically across a vertical plane S including an axis A of the spindle 5 to be described later in such a manner that an angle θ formed by both the rail attaching surfaces 4c and 4c' becomes 90°. Then, on the left and right rail attaching surfaces 4c and 4c', left and right Z-axis guide rails 10a and 10a' (hereinafter may be referred to as "first guide rail/member 10a" and "second guide rail/member 10a'" respectively) extending in the Z-axis are fixed.

The spindle 5 includes a rectangular tube shaped casing 5a, a spindle body 5b rotatably inserted and disposed in the casing 5a, and a spindle motor (not illustrated) to rotationally drive the spindle body 5b.

On portions of the outer surface of the casing 5a which are positioned above the axis A, left and right slider attaching surfaces 5c and 5c' (hereinafter may be referred to as "first attaching surface 5c" and "second attaching surface Sc" respectively) are formed to face the rail attaching surfaces 4c and 4c' and to extend in the Z-axis direction. These slider attaching surfaces 5c and 5c', similarly to the rail attaching surfaces 4c and 4c', are formed symmetrically across the vertical plane S in such a manner that an angle θ formed by both the slider attaching surfaces 5c and 5c' becomes 90°. In other words, the ball screw 11a (rotation driving shaft) is arranged such that an angle θ between a first linear line L1 connecting the axis B rotation of the ball screw 11a to a widthwise center 5d of the first attaching surface 5c and a second linear line L2 connecting the axis B of rotation to a widthwise center 5d' of the second attaching surface 5c' is smaller than 180°.

Then, on the left and right (i.e., first and second) slider attaching surfaces 5c and 5c', two pairs of Z-axis sliders (first slider and second slider) 10b and 10b' are arranged at the front and the rear (i.e., arranged in the longitudinal direction of the guide rails 10a and 10a'), and the Z-axis sliders (first slider and second slider) 10b and 10b' are slidably engaged with the Z-axis guide rails (first guide rail/member and second guide rail/member) 10a and 10a', respectively, so as to be movable in the Z-axis direction.

In this manner, a Z-axis sliding part 10d constituted by the left Z-axis guide rail (first guide rail/member) 10a and the left Z-axis slider (first slider) 10b and a Z-axis sliding part 10d' constituted by the right Z-axis guide rail (second guide rail/member) 10*a*' and the right Z-axis slider (second guide rail) 10*b*' spread upward and outward with respect to the vertical plane S.

Then, a Z-axis ball screw (hereinafter may be referred to as "rotation driving shaft") 11*a* extending in the Z-axis direction is provided to be positioned between the left and right Z-axis sliding parts 10*d* and 10*d*' on the casing 5*a* of the spindle 5. A Z-axis nut member (hereinafter may be referred to as "driven member") 11*b* is screwed on a middle portion of this Z-axis ball screw 11*a*, and the Z-axis nut member 11*b* is fixed on an upper end portion of the outer surface of the casing 5*a*. Further, to a rear end portion of the Z-axis ball screw 11*a*, a Z-axis drive motor (hereinafter may be referred to as "driving source") 11*c* is coupled, and the motor 11*c* is fixed on a rear end portion 4*d* of the support part 4*b* of the saddle 4.

In the horizontal machining center 1 according to this embodiment, the column 3 is made to move in the X-axis direction, the saddle 4 is made to move in the Y-axis direction, and further the spindle 5 is made to move in the Z-axis direction, and thereby a tool (not illustrated) attached to a tip portion of the spindle body 5*b* of the spindle 5 moves in the X-axis direction, the Y-axis direction, and the Z-axis direction, and thereby required machining is performed on a work.

Then, in Embodiment 1, when the two Z-axis guide rails 10*a* and 10*a*' are fixed to the support part 4*b* of the saddle 4 and the Z-axis sliders 10*b* and 10*b*' slidably engaged with both the guide rails 10*a* and 10*a*' are fixed to the casing 5*a* of the spindle 5, the guide rail attaching surfaces 4*c* and 4*c*' and the slider attaching surfaces 5*c* and 5*c*' are provided symmetrically across the vertical plane S including the axis A of the spindle body 5*b* in such a manner that the angle θ formed by the attaching surfaces 4*c* and 4*c*' and the angle θ formed by the attaching surfaces 5*c* and 5*c*' both become 90°, namely in such a manner that the paired Z-axis sliding parts 10*d* and 10*d*' form an inverted V shape spreading downward and outward with respect to the vertical plane S.

Therefore, a substantial interval between the paired Z-axis sliding parts 10*d* and 10*d*' is increased, the Z-axis ball screw 11*a* and further the Z-axis drive motor 11*c* to be disposed therebetween can be disposed closer to the axis A of the spindle body 5*b*, and therefore the spindle guide mechanism can be downsized.

By the way, when the respective attaching surfaces are disposed to make 180°, namely the respective attaching surfaces are disposed on the same plane, in order to avoid interference with the Z-axis sliding parts, the Z-axis ball screw and the like need to be disposed apart from the axis A, or the interval between the left and right Z-axis sliding parts needs to be increased, resulting in that the spindle guide mechanism may be increased in size in either case.

Further, since the Z-axis ball screw 11*a* can be disposed closer to the axis A of the spindle body 5*b*, by this ball screw 11*a*, a portion closer to the center of gravity can be driven, and therefore it is possible to decrease residual vibration and to increase acceleration, to thereby improve a machining speed.

Furthermore, since being structured in such a manner that the angle θ formed by the guide rail attaching surfaces 4*c* and 4*c*' and the angle θ formed by the slider attaching surfaces 5*c* and 5*c*' become 90°, the spindle guide mechanism can receive a cutting load and the moment that are equally divided in the X-axis direction and the Y-axis direction, and it is possible to extend a lifetime of the Z-axis guide rails 10*a* and 10*a*' and the Z-axis sliders 10*b* and 10*b*'.

Further, when the two Z-axis guide rails 10*a* and 10*a*' are fixed to the support part 4*b* of the saddle 4 and the Z-axis sliders 10*b* and 10*b*' slidably engaged with both the guide rails 10*a* and 10*a*' are fixed to the casing 5*a* of the spindle 5, these are disposed above the axis A of the spindle body 5*b*, and thus as compared to the case where the guide mechanism is disposed below the axis A, a lowermost end position of a Y-axis stroke of the spindle 5 can be positioned lower, as a result, a disposition position of a work to be machined on the spindle body 5*b* can be positioned lower, and therefore handling such as attachment/detachment of a work is facilitated.

Further, since the spindle guide mechanism is provided above the axis A of the spindle 5, as compared to the case where the spindle guide mechanism is provided below the axis A of the spindle 5, a margin space can be obtained between the spindle 5 and the bed 2, and thereby the rear rail mounting surface 2*b* of the bed 2 is allowed to be disposed one step higher than the front rail mounting surface 2*a* and between the ball screw mounting part 2*c* and the rear rail mounting surface 2*b*, the inclined wall 2*d* that increases in height as it goes to the rear side is allowed to be provided. As a result, a structure capable of improving support stiffness of the column 3 by the bed 2 and capable of withstanding a Z-axis machining reaction force with a weight reduction in the column 3 is made.

In Embodiment described above, the Z-axis sliding parts 10*d* and 10*d*' are provided only above the axis A of the spindle 5, but the Z-axis sliding parts may be provided also below the axis A of the spindle 5. In cases where they are provided as mentioned above, the residual vibration can be further decreased and the acceleration can be increased.

Further, in the aforementioned Embodiment, the two Z-axis guide rails 10*a* and 10*a*' are fixed to the support part 4*b* of the saddle 4 and the Z-axis sliders 10*b* and 10*b*' slidably engaged with the guide rails 10*a* and 10*a*' are fixed to the casing 5*a* of the spindle 5. However, the guide rails may be arranged on the spindle casing side, and the sliders may be arranged on the saddle side.

Further, in the aforementioned Embodiment, the case where the spindle as a moving body moves in the horizontal direction has been explained, but the present disclosure is also applicable to a spindle guide mechanism of a machine tool in which a moving body moves in the vertical direction, which is, for example, a vertical machining center.

Further, in the aforementioned Embodiment, the case where the angle θ formed by the attaching surfaces is 90° has been explained, but the angle θ in the present disclosure only needs to be an angle smaller than 180°.

The disclosure may be embodied in other specific forms without departing from the spirit or essential characteristics thereof. The present embodiment is therefore to be considered in all respects as illustrative and no restrictive, the scope of the disclosure being indicated by the appended claims rather than by the foregoing description, and all changes which come within the meaning and range of equivalency of the claims are therefore intended to be embraced therein.

The terms and descriptions used herein are used only for explanatory purposes and the present invention is not limited to them. Accordingly, the present invention allows various design-changes falling within the claimed scope of the present invention unless it deviates from the spirits of the invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A moving body guide mechanism of a machine tool, comprising:
   at least two bar-shaped guide members;
   sliders engaged with the two guide members, respectively, movably with respect to the guide members so that a moving body is guided along an axis parallel to a moving axis extending in a longitudinal direction of the guide members; and
   a saddle arranged movably in a vertical direction, the saddle having first and second attaching surfaces,
   wherein the moving body includes third and fourth attaching surfaces arranged on an outer surface thereof to oppose respectively the first and second attaching surfaces,
   the first and second attaching surfaces are symmetrically arranged with respect to a plane including a line being parallel to the moving axis, and the third and fourth attaching surfaces are arranged symmetrically with respect to the plane including the axis parallel to the moving axis,
   the moving body suspends from the saddle and is sustained movably in an axial direction in which the axis extends,
   an angle formed by the first and second attaching surface is same as an angle formed by the third and fourth attaching surfaces, and is smaller than 180°,
   when the guide members are attached to the first and second attaching surfaces, the sliders are attached to the third and fourth attaching surfaces,
   when the guide members are attached to the third and fourth attaching surfaces, the sliders are attached to the first and second attaching surfaces, and
   the moving axis is configured between the first and third attaching surfaces, and is arranged above the moving body.

2. The moving body guide mechanism according to claim 1, wherein the angle formed by the first and second attaching surfaces becomes 90°, and
   the angle formed by the third and fourth attaching surfaces becomes 90°.

3. The moving body guide mechanism according to claim 1, wherein the first to fourth attaching surfaces extend in the longitudinal direction.

4. The moving body guide mechanism according to claim 2, wherein the first to fourth attaching surfaces extend in the longitudinal direction.

5. The moving body guide mechanism according to claim 1, wherein
   the moving body is a spindle including the axis extending in a horizontal direction and rotationally driving a tool attached to a tip portion of the spindle,
   the angle formed by the first and second attaching surfaces becomes 90°,
   the angle formed by the third and fourth attaching surfaces becomes 90°, and
   the first to fourth attaching surfaces extend in the longitudinal direction.

6. The moving body guide mechanism according to claim 1,
   the guide members are fixed to the saddle, and
   the sliders are fixed to the moving body.

7. A moving body guide mechanism of a machine tool, comprising:
   a first guide member;
   a second guide member arranged in parallel to the first guide member;
   a saddle arranged movably in a vertical direction, the saddle having first and second attaching surfaces;
   a first slider slidably engaged with the first guide member; and
   a second slider slidably engaged with the second guide member,
   wherein the moving body includes third and fourth attaching surfaces arranged on an outer surface thereof to oppose respectively the first and second attaching surfaces,
   wherein the first slider and the second slider are slidably moved along the first guide member and the second guide member, respectively, to guide a moving body along an axis parallel to a longitudinal direction of the guide members,
   the first and second attaching surfaces are arranged symmetrically with respect to a plane including a line being parallel to the moving axis, and third and fourth attaching surfaces are arranged symmetrically with respect to the plane including the line being parallel to the moving axis,
   the moving body suspends from the saddle and is sustained movably in an axial direction in which the axis extends,
   an angle formed by the first and second attaching surfaces is same as an angle formed by the third and fourth attaching surfaces, and is smaller than 180°,
   when the first and second guide members are respectively attached to the first and second attaching surfaces, the first and second sliders are respectively attached to the third and fourth attaching surfaces, when the first and second guide members are respectively attached to the third and fourth attaching surfaces, the first and second sliders are respectively attached to the first and second attaching surfaces, and the moving axis is configured between the first and third attaching surfaces, and is arranged above the moving body.

8. The moving body guide mechanism according to claim 7, wherein the angle formed by the first and second attaching surfaces is 90°, and the angle formed by the third and fourth attaching surfaces is 90°.

9. The moving body guide mechanism according to claim 7 wherein the the first to fourth attaching surfaces extend in the longitudinal direction.

10. The moving body guide mechanism according to claim 8, wherein the first to fourth attaching surfaces extend in the longitudinal direction.

11. The moving body guide mechanism according to claim 7, wherein the moving body is a spindle including an axis extending in a horizontal direction and rotationally driving a tool to be attached to a tip portion of the spindle, and the first and second guide members or the first and second sliders are provided at a level higher than the axis such that the angle formed by the first and second attaching surfaces is 90°.

12. The moving body guide mechanism of a machine tool according to claim 7, wherein the first and second guide members are fixed to the saddle, and the first and second sliders are fixed to the moving body.

13. A machining center, comprising:

a first guide member;

a second guide member arranged in parallel to the first guide member;

a first slider slidably engaged with the first guide member;

a second slider slidably engaged with the second guide member;

a saddle arranged movably in a vertical direction, the saddle having first and second attaching surfaces;

a moving body including third and fourth attaching surfaces;

a rotation driving shaft arranged in parallel to the first guide member and the second guide member, the rotation driving shaft having an axis of rotation;

a driving source configured to rotate the rotation driving shaft; and a driven member configured to be moved along the rotation driving shaft when the rotation driving shaft is rotated by the driving source, the driven member being attached to the moving body, wherein an angle between a first linear line and a second linear line is smaller than 180°, where the first linear line passes through the axis of rotation of the rotation driving shaft and is parallel to the third attaching surface, and where the second linear line passes through the axis of rotation of the rotation driving shaft and is parallel to the fourth attaching surface, the moving body suspends from the saddle, and is sustained movably in an axial direction in which the axis extends, when the guide members are attached to the first and second attaching surfaces, the sliders are attached to the third and fourth attaching surfaces, when the guide members are attached to the third and fourth attaching surfaces, the sliders are attached to the first and second attaching surfaces, and a moving axis is configured between the first and third attaching surfaces, and is arranged above the moving body.

14. The machining center according to claim 13, wherein the rotation driving shaft is a ball screw and the driven member is a nut member screwed on the ball screw.

15. The machining center according to claim 13, wherein the angle formed by the first and second linear lines is 90°.

* * * * *